April 11, 1939.  J. VERDERBER ET AL  2,153,997

SPEED VARYING MECHANISM

Filed Aug. 15, 1935   2 Sheets-Sheet 1

INVENTORS
Jos. Verderber
E. F. Batterman
BY
C. F. Heinkel,
ATTORNEY.

April 11, 1939.  J. VERDERBER ET AL  2,153,997
SPEED VARYING MECHANISM
Filed Aug. 15, 1935   2 Sheets-Sheet 2

INVENTORS
Jos. Verderber
BY E. F. Batterman
C. F. Henkel ATTORNEY.

Patented Apr. 11, 1939

2,153,997

UNITED STATES PATENT OFFICE 2,153,997

SPEED VARYING MECHANISM

Joseph Verderber, Cleveland, and Elmer F. Batterman, East Cleveland, Ohio

Application August 15, 1935, Serial No. 36,390

8 Claims. (Cl. 74—189.5)

The present invention relates to automatic and controlled changing of speed.

The idea or conception of invention herein is a shaft driven at constant speed to drive another shaft at a different speed and to effect the change or variation of speed by a control means including gearing and fluid pressure means operating conjointly.

In practice, machine tools, such as lathes for instance, it is desirable that the same can be driven at various speeds for differently sized work or heavier or lighter cuts or different kinds of materials operated upon. Cone pulleys and belt drive have been resorted to and are in common use now but such cone pulleys entail definite speeds since the cone pulleys remain of the same size and no speed changes are attainable except what is afforded by the different diameters of the steps on the cones. Friction drives with adjustable friction rollers have been used to vary speeds but friction drive is out of date since it is insufficiently positive in action in present day production. Direct drives have been used but these lack speed changes and can be used for production of one kind of work only.

The present invention aims at an improvement on previous driving structures.

Objects of the present invention are:

To provide a speed changing or varying means which is simple of structure, easy and convenient of operation and control and efficient in operation.

To provide a speed changing or varying means wherein the changing and variation is attained by combined gearing and fluid pressure means.

To provide a control means for a speed changing or varying means which is easy and convenient of operation for positive speed changing and varying and still permits of some automatic speed changing or varying without the use of the control means.

Other objects will be pointed out in this specification during the description of the device shown in the accompanying drawings or will become apparent or obvious or will suggest themselves upon an inspection of this specification and the accompanying drawings and of the invention disclosed in this application.

The present invention is illustrated in the one embodiment thereof shown in the accompanying drawings in which like reference characters refer to like parts throughout the views thereof, although applicants are aware that the invention illustratively shown in the drawings can be applied to or embodied in other structures and that changes in structure and in arrangement of parts can be made within the scope of the appended claims and the spirit and intent of the present invention.

In the accompanying drawings—

Figure 4:
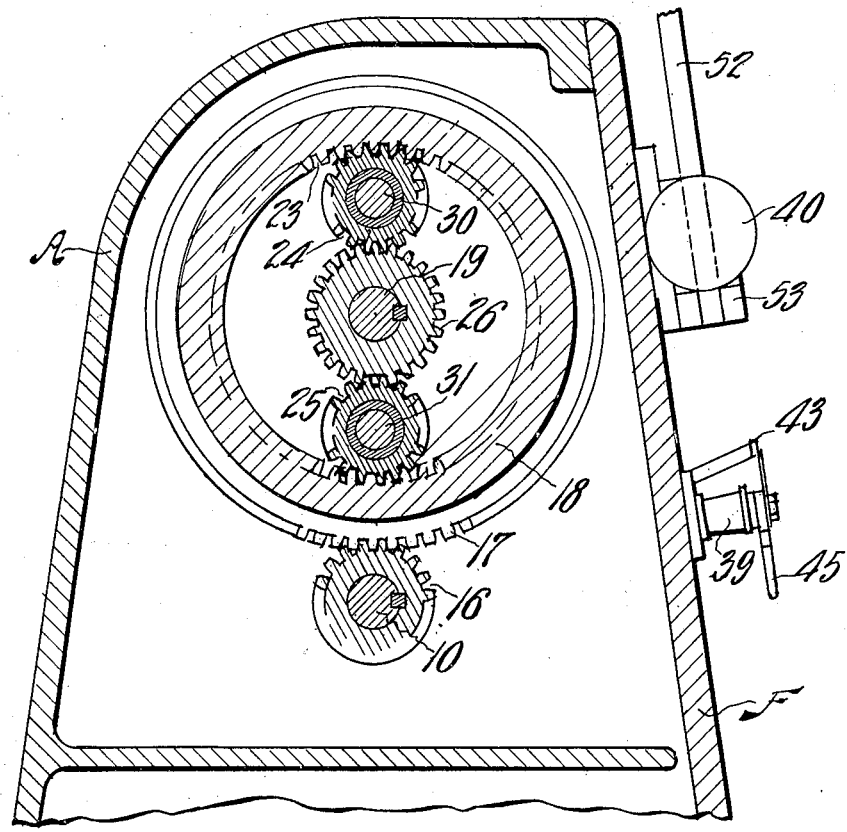
Fig. 4 is a vertical section taken on line 4—4 of Fig. 1 and shows the preferred manner of mounting the flow reversing and the control means on the cover Referring now particularly to the device shown in the drawings.

The housing A is here shown open at one side in Fig. 4, preferably at the operator's side so that mechanism interior of the housing can be installed, inspected, and removed easily and conveniently. The bottom of the housing can be made to suit any machine or support whereto the device is to be attached.

The driving shaft 10 is journaled in the housing and the bushings 11 and 12 are introduced to provide a better journal and for reducing friction; anti-friction bearings may profitably be used in place of the bushings 11 and 12 as well as in places where other bushings are shown.

The electric motor B drives the shaft 10 through the coupling mechanism 13 of usual or approved structure. This motor may conveniently be of the constant speed type although variable speed motors could be used. A constant speed motor is more efficient due to saving electric current which usually is lost in speed changing.

The pump C is a fluid pressure pump driven by the shaft 10 and has the outlet 14 and the intake 15 which latter leads to the supply tank D. It is preferred that the bottom of the tank D is above the outlet 14 so that there will always be a head of fluid substance to feed the pump and the pump will not need priming as long as there is some fluid substance in the tank D. The fluid substance to be handled by the pump may be air or oil or water or other fluid substance which a pump can handle. Water is preferred due to its quick and easy flow and practical incompressibility but subjects the mechanism to rust unless rust proof material is used. Oil flows less easily than water and is not as good as water in this respect but it does not cause rusting. Air is not as good as water or oil for a positive drive since it is easily compressible and does not lend itself so well to a positively operating driving means. However, air, due to its ready flow and compressibility, has the advantage of providing a cushioning means and also to take up minor changes in speed as, for instance, when the load on the driven spindle is suddenly changed, air in the mechanism will be compressed to some extent and causes a reduction in speed. However, in the present invention, the air is used only as a medium to advance or retard the gear mechanism and does not enter into positive drive directly. However, good results have been attained with air as well as with water or oil in the present invention. When air is used by the pump, the tank D can, of course, be omitted.

The pinion 16 is shown as being keyed onto the shaft 10 and meshes with the gear 17 on the rotatable member 18.

The driven spindle 19 is journaled in the housing through the bushings 20 and 21. The rotatable member 18 is journaled on the shaft 19 through the bushing 22 and has the internal gear 23 meshing with the planetary or idler gears 24 and 25 which mesh with the pinion 26 keyed onto the shaft 19. The yoke 27 is journaled on the shaft 19 through the bushings 28 and 29 and has the pins 30 and 31 extending from one end thereof to form a journal bearing for the planetary gears 24 and 25 respectively through the bushings 32 and 33. The gear 34 is formed on the other end of the yoke 27 and meshes with the pinion 35 which is keyed onto the shaft 36.

The shaft 36 has one end thereof journaled in the boss 37 forming part of the housing through the bushing 38 and the other end enters the fluid pressure motor E which extends into the housing and is secured thereto.

The cover F is secured to the open side of the housing and, preferably, has the flow control valve 39 and the flow reversing device 40 secured thereto so that an operator may conveniently reach the same for operation thereof.

The flow control or flow throttling valve 39 comprises the body part and a rotatable valve therein of a structure usual in pipe valves with a hole transversely therethrough and has the inlet 41 and the outlet 42. The scale 43 is secured to the stationary base of the valve 39 and is graduated according to a scale to be used. The pointer 44 rotates with the rotatable valve when the handle 45 is moved to rotate the rotatable valve and travels over the scale to show the amount of rotative movement made by the rotatable valve and consequent flow of fluid pressure therethrough. The base of the valve 39 may be secured to the cover F if desired although the piping connected thereto will support the valve without further securing means.

The flow reversing device 40 has the body 46 and the plunger 47 slidable longitudinally in the bore 48 of the body. The plunger has the grooves 49 and 50 longitudinally through the diametrically larger part thereof so that fluid may flow from one end of the bore 48 to the other through the grooves. The plunger has the diametrically reduced part 51 which extends through and out beyond one end of the body where it engages the operating handle 52 which is fixed in the lower part of the body as shown at 53.

The lower part of the body 46 has therein the ports 54, 55, and 56 each opening into a separate compartment and each compartment having a pipe leading thereinto. The diametrically larger part of the plunger 47 has the port 57 transversely in the lower side thereof and extends longitudinally so that the middle port 55 will alternately establish connection with the end ports when the plunger is shifted longitudinally in the bore in the manner of slide valves in steam engines. The pipe 58 is threaded into the housing or body 46 in such a place that it opens into the groove 49.

As to the operation of the mechanism described:

The motor B, when operated, rotates the driving shaft 10 and by that rotation operates the fluid pump C which takes fluid from the tank D through the pipe 15 and discharges the same under pressure through the pipe 14. The rotation of the motor B also rotates the pinion 16 which rotates the rotatable member 18 (through the gear 17 thereon) on the shaft 19 but does not drive this shaft. Upon rotation of the rotatable member 18, the internal gear therein rotates both of the idler gears 24 and 25 which, in turn, rotate the pinion 26 and thereby rotate the shaft 19 as is usual in planetary gearing. The speed of the shaft 19, of course, depends upon the pitch diameter ratios of the gears 16 and 17 while the control means rotates the yoke at the same speed (revolutions per minute) as the rotatable member 18.

Figure 1:
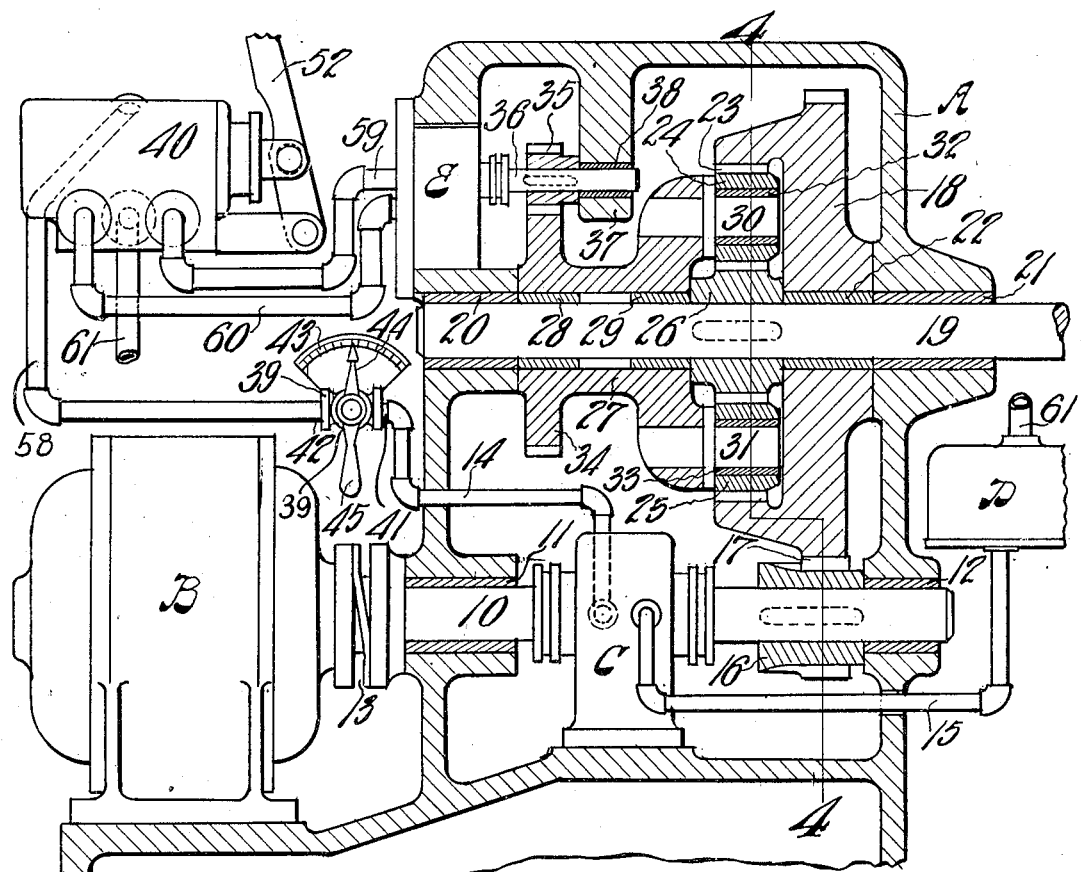
Fig. 1 is a vertical section through a speed changing or varying device embodying the present invention, the flow control valve and the flow reversing valve and the fluid supply tank being shown more or less diagrammatically to better show relations of elements.
Figure 2:
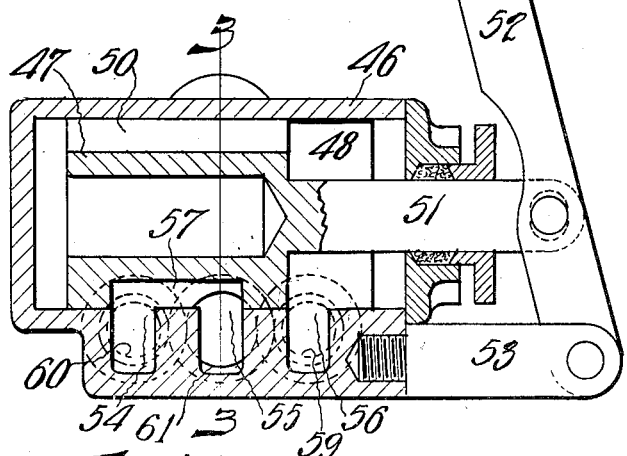
Fig. 2 is a longitudinal section through the flow reversing device; the section being taken on line 2—2 of Fig. 3.
Figure 3:
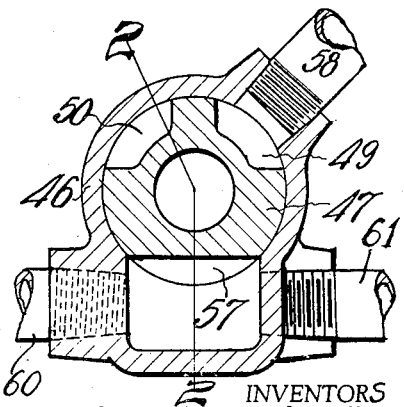
Fig. 3 is a transverse section taken on line 3—3 of Fig. 2.

The flow control valve 39, when fully open, lets fluid from the pipe 14 flow therethrough and into the pipe 42, thence into and through the pipe 58 and into the grooves 49 and 50 of the reversing device 40. When the plunger is in the position shown in Fig. 2, the fluid flows into the bore 48, thence into the port 56 and through the pipe 59 into the fluid pressure motor E to cause rotation therein in one direction thence from the motor E through pipes or ports 60, 54, 57, and 61. Upon moving the handle or hand lever 52 outwardly of the flow reversing device, the middle port 55 will be brought into communication with the port 56 and the fluid will pass to pipe 60 which leads into the fluid pressure motor and will discharge from the latter through pipe 59, the valve ports and pipe 61. This action reverses the rotation of the shaft 36.

Manipulation of the handle on the flow control valve opens and closes the valve to permit more or less fluid to flow therethrough and into the fluid pressure motor and thereby cause variation in the speed thereof.

When the fluid pressure motor and the yoke and the rotatable member rotate while the valve handle 45 is in a certain position and the motor E runs at a certain speed, there is no change or variation in the speed of the shaft 19 except what variations are caused by compression of the fluid in the piping and the fluid pressure motor. When the flow control valve is opened or closed further, more or less fluid will flow into the fluid pressure motor and the same will respond by rotating slower or faster as the case may be. This results in change of speed of the pinions 24 and 25 and consequent change of speed of the shaft 19 and the yoke and the pinions thereon will rotate at higher or lower speeds about the axis of the shaft 19 than the rotatable member 18. This results in a change of ratios in the gearing and in change and variation in the rotation of the pinion 26 and consequently the shaft 19 to which the pinion is keyed.

Most fluids are compressible to some extent. This feature is used in this invention to provide automatic speed changing without manipulating the control means. Air or equivalent gas is well adapted for this. When in a lathe for instance, the lathe tool strikes a hard spot or the cutting pressure is increased suddenly, the speed of the spindle will decrease which causes the pinions 24 and 25 to rotate on their own axes, the speed of the driving shaft remaining constant and the fluid pressure motor being controlled to rotate at a certain speed and the yoke will be caused to rotate at a different speed than the driving shaft and thus to compress the pressure fluid in the discharge end of the fluid pressure motor which tends to slack it down and thereby automatically reduce the speed of the driven shaft temporarily. The motor E, preferably, is of the two rotor type such as are used in pumps.

The mechanism shown and described is simple of structure and of operation. Speed variation and changing of the shaft 19 is easily and conveniently effected by merely manipulating the handle 45 of the flow control valve. Reversing of rotation of the shaft 19 is easily and conveniently effected by manipulation of the handle or lever 52. Minor speed changing is automatically attained by compressibility of the fluid used.

We claim:

1. A speed varying and reversing device having a housing, a driving and a driven shaft journaled in said housing, gears in permanent mesh between both of said shafts, a fluid pump within said housing and driven by said driving shaft, a fluid pressure motor operated by fluid from said pump and extending into said housing and being removable from the outside thereof, said motor acting on said gears to vary the speed ratio of said shafts, a manually controlled flow control valve to limit the flow of fluid from said pump to said motor and being mounted on the outside of said casing, and a manually controlled flow reversing device to reverse the direction of rotation of said motor and driven shaft.

2. A speed varying and reversing device having a housing, a removable cover on a side of said housing for access to the interior of said housing, a driving and a driven shaft journaled in said housing, gears within said housing and connecting both of said shafts drivingly, an electric motor mounted on said housing and driving said driving shaft in one rotative direction, a fluid pump within said housing and driven by said driving shaft, a fluid pressure motor operated by fluid from said pump and extending into said housing and being removable from the outside thereof, said fluid pressure motor adapted to act on said gears to vary the speed ratio of said shafts, a flow control valve to limit the flow of fluid from said pump to said fluid pressure motor and being mounted on said cover, and a flow reversing device mounted on said cover and adapted to reverse the rotation of said fluid pressure motor and thereby reverse the direction of rotation of said driven shaft while the direction of rotation of said electric motor remains the same.

3. A speed varying and motion reversing device having driving and driven spindles sidewise of each other, a train of gears in permanent positive driving connection with both of said spindles, a yoke journaled on said driven spindle and carrying gears forming parts of said train of gears, a fluid driven motor driving a gear meshing with a gear on said yoke, a fluid pump having the rotor thereof keyed to said driving spindle and feeding fluid to said motor, and a manually adjustable valve means in the outlet of said pump and having graduations and a finger moving thereover for regulating and showing flow of fluid into said motor.

4. A speed varying and motion reversing device having driving and driven spindles sidewise of each other, a train of gears in permanent positive driving connection with both of said spindles, a yoke journaled on said driven spindle and carrying gears forming parts of said train of gears, a fluid driven motor driving a gear permanently meshing with a gear on said yoke, a fluid pump having the rotor thereof permanently connected to said driving spindle and feeding fluid to said motor, a manually operated individual flow reversing device connected to the inlet of said fluid driven motor and to the outlet of said fluid pump, and a valve means in the outlet of said fluid pump for controlling the flow of fluid into said flow reversing device.

5. A speed varying and motion reversing device having driving and driven spindles sidewise of each other, a train of gears in permanent driving connection with both of said spindles, a yoke journaled on said driven spindle and carrying gears forming parts of said train of gears, a fluid driven motor driving a gear meshing with a gear on said yoke, a fluid pump having the rotor thereof mounted on and driven by said driving spindle and feeding fluid to said motor, a flow reversing device connected to the inlet of said fluid driven motor and to the outlet of said pump, a valve in the outlet of said pump for controlling flow of fluid through the outlet of the pump and having a graduated means thereon for setting the valve to let fluid pass therethrough in certain quantity and under certain pressure.

6. A speed varying device having a housing, a driving shaft journaled in said housing, a driven shaft journaled in said housing parallel with said driving shaft, a gear secured to said driving shaft, a gear journaled on said driven shaft and being in permanent mesh with said gear on said driving shaft, a yoke journaled on said driven shaft, a fluid pressure pump secured to said driving shaft, a rotary fluid pressure motor operated by fluid pressure from said pump and rotating said yoke, a gear secured to said driven shaft, a planetary gearing between said yoke and said gear that is journaled on said driven shaft, and a control means for varying the flow of fluid pressure from said pump to said motor for varying the speed of said driven shaft relative to said driving shaft.

7. A speed varying device having a housing, a driving shaft journaled in said housing, a driven shaft journaled in said housing parallel with said driving shaft, a spur gear secured to said driving shaft, a spur gear journaled on said driven shaft and being in permanent mesh with said gear on said driving shaft, a fluid pressure pump secured to said driving shaft, a yoke journaled on said driven shaft, a rotary fluid pressure motor operated by fluid pressure from said pump and rotating said yoke, a spur gear secured to said driven shaft, a planetary spur gearing between said yoke and said gear that is journaled on said driven shaft, and a control means for varying the flow of fluid pressure from said pump to said motor for selectively varying the speed of said driven shaft relative to said driving shaft.

8. A speed varying and motion reversing device having a housing, a driving shaft journaled in said housing, a driven shaft journaled in said housing, a gear secured to said driving shaft, a gear journaled on said driven shaft and being in permanent driving connection with said gear on said driving shaft, a yoke journaled on said driven shaft, a fluid pressure pump secured to said driving shaft, a rotary fluid pressure motor operated by fluid pressure from said pump and rotating said yoke, a gear secured to said driven shaft, a planetary gearing between said yoke and said gear that is journaled on said driven shaft, and a control means for varying the quantity and the direction of fluid to said motor including, a tubular connection between said pump and said motor, a means in said connection for selectively varying the quantity of fluid flowing into said motor for varying the speed thereof, and a flow reversing means in said connection for selectively reversing the rotation of said motor.

JOSEPH VERDERBER.
ELMER F. BATTERMAN.